United States Patent
Reinhardt et al.

(10) Patent No.: US 10,984,422 B2
(45) Date of Patent: Apr. 20, 2021

(54) TRACK BANK CHARGEBACK SENSITIVITY USING DISPROPORTIONAL RISK LEVEL SAMPLING DESIGN

(71) Applicant: Microsoft Technology Licensing, LLC, Redmond, WA (US)

(72) Inventors: Adam Feldman Reinhardt, Redmond, WA (US); Yung-Wen Liu, Redmond, WA (US); Shoou-Jiun Wang, Sammamish, WA (US); Jayaram N. M. Nanduri, Isaaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 264 days.

(21) Appl. No.: 15/987,585

(22) Filed: May 23, 2018

(65) Prior Publication Data
US 2019/0362351 A1 Nov. 28, 2019

(51) Int. Cl.
*G06Q 20/40* (2012.01)
*G06Q 40/02* (2012.01)
*G06Q 20/42* (2012.01)

(52) U.S. Cl.
CPC ......... *G06Q 20/4016* (2013.01); *G06Q 20/42* (2013.01); *G06Q 40/02* (2013.01)

(58) Field of Classification Search
USPC .................................................. 705/35, 39
See application file for complete search history.

(56) References Cited

U.S. PATENT DOCUMENTS

| | | | | |
|---|---|---|---|---|
| 8,175,908 | B1* | 5/2012 | Anderson | G06Q 30/0201 705/7.29 |
| 8,655,773 | B1* | 2/2014 | Fasoli | G06Q 40/00 705/38 |
| 9,947,055 | B1* | 4/2018 | Roumeliotis | G06Q 40/12 |
| 2011/0106695 | A1* | 5/2011 | Fernandez | G06Q 20/10 705/39 |
| 2012/0158566 | A1* | 6/2012 | Fok | G06Q 40/00 705/35 |
| 2014/0012682 | A1* | 1/2014 | Fraser | G06Q 10/00 705/14.66 |

(Continued)

OTHER PUBLICATIONS

Payment Gateway Sep. 17, 2015 (Year: 2015).*
Instabill Dec. 16, 2012 (Year: 2012).*

*Primary Examiner* — William E Rankins
(74) *Attorney, Agent, or Firm* — Arent Fox LLP

(57) ABSTRACT

Examples described herein generally relate to a computer device including a memory, and at least one processor configured to process a transaction. The computer device receives customer transaction information. The computer device evaluates the customer transaction information to determine a risk score for the transaction. The computer device assigns the transaction, based on the risk score, to one of a plurality of stratums including at least a first stratum and a second stratum. The computer device selects a merchant identifier (MID) from at least a first MID associated with the first stratum and a second MID associated with the second stratum based on at least the assigned stratum and a target chargeback rate for at least one of the first MID or the second MID. The computer device transmits the transaction information and the selected MID to an issuing bank.

17 Claims, 5 Drawing Sheets

(56) References Cited

U.S. PATENT DOCUMENTS

| | | | | |
|---|---|---|---|---|
| 2014/0129424 A1* | 5/2014 | Murphy | ................ | G06Q 20/14 |
| | | | | 705/39 |
| 2015/0220920 A1* | 8/2015 | Howe | .................... | G06Q 20/40 |
| | | | | 705/44 |
| 2015/0348208 A1* | 12/2015 | Nordyke | ................ | G06Q 40/12 |
| | | | | 705/30 |

* cited by examiner

TRACK BANK CHARGEBACK SENSITIVITY USING DISPROPORTIONAL RISK LEVEL SAMPLING DESIGN

BACKGROUND

The present disclosure relates to transaction processing, and more particularly to increasing transaction approval rates based on merchant risk analysis.

In a traditional card-not-present transaction, a merchant collects transaction data from the customer, usually using a form on the website completed by the customer. The merchant traditionally validates the transaction by forwarding the transaction data to a processor, who transmits the transaction data to a retail bank (e.g., a card issuer) via a card network. The retail bank may perform a risk analysis on the transaction data to determine whether to allow the transaction. If the retail bank determines that the transaction is risky due to fraud or a potential for chargebacks, the retail bank may deny the transaction.

A chargeback occurs when a transaction is charged to a card and the card holder repudiates the transaction, for example, by alleging the transaction was fraudulent or otherwise deficient. In a chargeback, the merchant must refund the purchase price, and may also lose the value of the merchandise that was shipped. The retail bank may also incur costs to resolve the chargeback. Accordingly, both merchants and retail banks have an interest in preventing transactions that will result in chargebacks. For example, the merchant, the retail bank, or third party providers may conduct screening to predict a risk of a transaction resulting in a chargeback. A card network may limit the transaction information to certain fixed, pre-defined fields. Accordingly, a retail bank may be provided a limited data set upon which to determine whether the transaction is likely to result in a chargeback. A retail bank may act conservatively and err toward rejecting transactions, which may lead to a higher rate of false positives (where valid transactions are incorrectly rejected), resulting in lost sales opportunities for the merchant.

Thus, there is a need in the art for improvements in card transaction processing.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an example, the disclosure provides a computer device for processing transactions. The computer device may include memory and a processing system comprising at least one processor communicatively coupled with the memory. The processor may be configured to receive customer transaction information. The processor may be configured to evaluate the customer transaction information to determine a risk score for the transaction. The processor may be configured to assign the transaction, based on the risk score, to one of a plurality of stratums, the plurality of stratums including at least a first stratum and a second stratum. The processor may be configured to select a merchant identifier (MID) from at least a first MID associated with the first stratum and a second MID associated with the second stratum based at least on the assigned stratum and a target chargeback rate for at least one of the first MID or the second MID. The processor may be configured to transmit the transaction information and the selected MID to an issuing bank.

In another example, the disclosure provides a method executed by a computer processor, of processing transactions. The method may include receiving customer transaction information. The method may include evaluating the customer transaction information to determine a risk score for the transaction. The method may include assigning the transaction, based on the risk score, to one of a plurality of stratums, the plurality of stratums including at least a first stratum and a second stratum. The method may include selecting a MID from at least a first MID associated with the first stratum and a second MID associated with the second stratum based at least on the assigned stratum and a target chargeback rate for at least one of the first MID or the second MID. The method may include transmitting the transaction information and the selected MID to an issuing bank.

In another example, the disclosure provides a computer-readable medium. The computer-readable medium may include code executable by one or more processors for processing a transaction. The computer-readable medium may include code for receiving customer transaction information. The computer-readable medium may include code for evaluating the customer transaction information to determine a risk score for the transaction. The computer-readable medium may include code for assigning the transaction, based on the risk score, to one of a plurality of stratums, the plurality of stratums including at least a first stratum and a second stratum. The computer-readable medium may include code for selecting a MID from at least a first MID associated with the first stratum and a second MID associated with the second stratum based at least on the assigned stratum and a target chargeback rate for at least one of the first MID or the second MID. The computer-readable medium may include code for transmitting the transaction information and the selected MID to an issuing bank.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
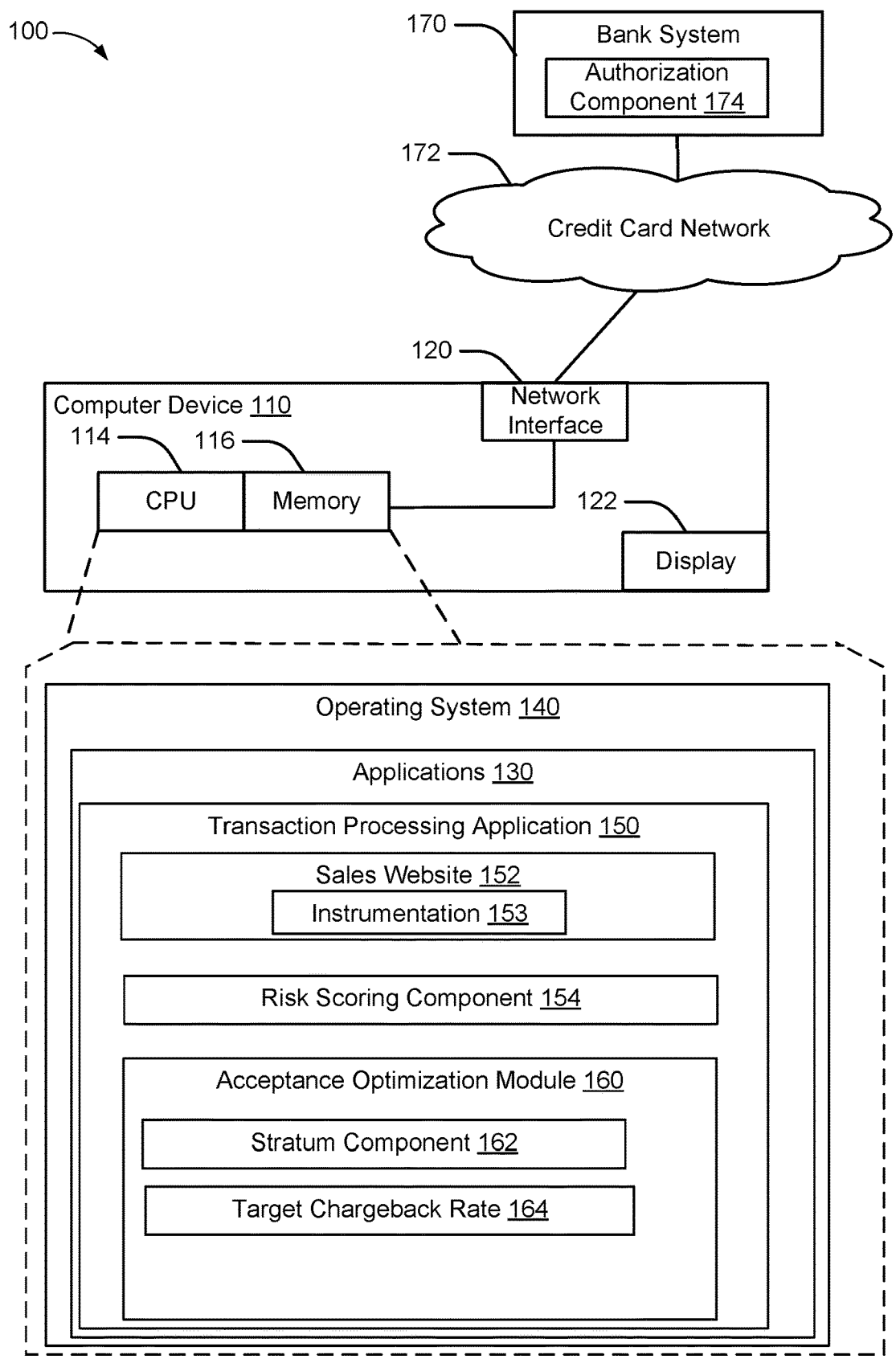
FIG. 1 is a diagram of an example computer system for processing credit card transactions, in accordance with an implementation of the present disclosure.

The present disclosure provides systems and methods for processing transactions by a merchant. The disclosure provides techniques that allow a merchant to utilize the merchant's customer data to improve approval rates of transactions and reduce false positive detections on the part of an issuing bank. The present disclosure uses the example of credit card transactions using a credit card network. Other types of card transactions such as debit card signature transactions may be processed via a credit card network. The disclosed techniques may be applicable to any transaction including a merchant identification number (MID) that is used to authorize or approve the transaction.

A merchant may have transaction contextual data that is not available to a credit card issuer. For example, a customer may maintain an account with the merchant and the merchant may have a history of customer interactions with the merchant. The merchant may also operate a webpage and obtain information regarding the customer's interaction with the website prior to making a purchase. Additionally, the merchant may have information regarding how a good or service is to be delivered to the customer. In a conventional credit card network, this transaction contextual information is available to the merchant and is not available to the credit card issuer due to limitations on the data transmitted via a credit card network. Accordingly, the merchant may be able to evaluate the risk of a particular transaction better than a credit card issuer based on the data available to the merchant.

One technique to improve credit card approval rates is to utilize different merchant identification numbers or merchant identifiers (MIDs) for credit card transactions. The MID is one data field that is transmitted in a conventional credit card transaction. Large merchants typically use multiple MIDs to categorize a type of transaction, currency, or profit center of the merchant for accounting purposes. A merchant that can identify low risk transactions may improve the transaction allowance rate of a MID by assigning low risk transactions to the MID. Such a MID may be referred to as a trusted MID. The allowance rate of the trusted MID may improve over time as the credit card issuer experiences a low number of chargebacks associated with the trusted MID. A merchant may also inform the credit card issuer of a policy associated with the trusted MID and request special treatment.

The use of a trusted MID, however, may not actually improve overall transaction approval rate for a merchant. In order to assign low risk transactions to the trusted MID, the merchant may not assign the same low risk transactions to other MIDs. Accordingly, the other MIDs may experience higher chargeback rates as the low risk transactions are removed from the pool of transactions for the other MIDs. Over time, the other MIDs may experience a decline in allowance rate inversely proportional to the improvement in the allowance rate of the trusted MID. Therefore, the overall allowance rate of credit card transactions for the merchant may remain unchanged.

Generally described, the present disclosure provides a merchant transaction system that improves overall transaction allowance rate for the merchant by assigning transactions to different MIDs based on risk scores and target chargeback rates. Each MID may be associated with a target chargeback rate. A first MID may be assigned a low target chargeback rate selected to improve the approval rate of transactions using the first MID. A second MID may be assigned a target chargeback rate that is consistent with industry chargeback rates. Accordingly, the second MID may experience a constant standard approval rate. Individual transactions may be assigned to a MID based on a risk score and a probabilistic or proportional allocation to achieve the desired chargeback rates.

Referring now to FIG. 1, an example merchant transaction system 100 includes a computer device 110. The computer device 110 may be, for example, any mobile or fixed computer device including but not limited to a computer server, desktop or laptop or tablet computer, a cellular telephone, a personal digital assistant (PDA), a handheld device, any other computer device having wired and/or wireless connection capability with one or more other devices, or any other type of computerized device capable of processing credit card transactions.

The computer device 110 may include a central processing unit (CPU) 114 that executes instructions stored in memory 116. For example, the CPU 114 may execute an operating system 140 and one or more applications 130, which may include a transaction processing application 150. The computer device 110 may also include a network interface 120 for communication with external devices via a network. For example, the computer device 110 may communicate with a bank system 170 of a credit card issuer via a credit card network 172.

The computer device 110 may include a display 122. The display 122 may be, for example, a computer monitor or a touch-screen. The display 122 may provide information to an operator and allow the operator to configure the computer device 110.

Memory 116 may be configured for storing data and/or computer-executable instructions defining and/or associated with an operating system 140 and/or application 130, and CPU 114 may execute operating system 140 and/or application 130. Memory 116 may represent one or more hardware memory devices accessible to computer device 110. An example of memory 116 can include, but is not limited to, a type of memory usable by a computer, such as random access memory (RAM), read only memory (ROM), tapes, magnetic discs, optical discs, volatile memory, non-volatile memory, and any combination thereof. Memory 116 may store local versions of applications being executed by CPU 114. In an implementation, the memory 116 may include a storage device, which may be a non-volatile memory.

The CPU 114 may include one or more processors for executing instructions. An example of CPU 114 can include, but is not limited to, any processor specially programmed as described herein, including a controller, microcontroller, application specific integrated circuit (ASIC), field programmable gate array (FPGA), system on chip (SoC), or other programmable logic or state machine. The CPU 114 may include other processing components such as an arithmetic logic unit (ALU), registers, and a control unit. The CPU 114 may include multiple cores and may be able to process different sets of instructions and/or data concurrently using the multiple cores to execute multiple threads.

The operating system 140 may include instructions (such as applications 130) stored in memory 116 and executable by the CPU 114. The operating system 140 may include the transaction processing application 150 for assigning credit card transactions to MIDs. The transaction processing application 150 may handle transactions from one or more business units of a merchant.

The transaction processing application 150 may include a sales website 152 for receiving customer credit card transaction information, a risk scoring component 154 for determining a risk score based on the customer credit card transaction information, and an acceptance optimization module 160 for assigning a MID to the transaction.

The sales website 152 may be a website hosted by the computer device 110 that facilitates a sales transaction. For example, the sales website 152 may provide information about products or services offered by the merchant. The sales website 152 may provide a checkout feature that provides a user interface for a credit card customer to enter personal and credit card information. The sales website 152 may include instrumentation 153. For example, the instrumentation 153 may be provided as a software development kit (SDK) for providing tools to that may be added to the sales website 152. The merchant may host the website and instrumentation 153 on one or more enterprise servers or cloud servers (e.g., computer device 110). The instrumentation 153 may provide the sales website 152 with capability to monitor a customer's interaction with the website and generate transaction contextual data for a session (e.g., user interaction with the merchant website) leading to the transaction. In an implementation, the transaction contextual data may include a device fingerprint identifying a hardware device (or virtual device) used to make a transaction. The device fingerprint may be a fuzzy identification of a user device that may be applicable across multiple sessions and properties (e.g., websites). The fuzzy identification may not require any specific piece of identification, but may instead may be based on a set of available information. The available information may be hashed according to a defined algorithm to generate the device fingerprint such that when the set of available information is used for another transaction, the device can be identified. For example, the device fingerprint may enable detection and defense against bot behavior by detecting multiple transactions performed by the same device. Further, for example, the device fingerprint may be used in fraud and abuse prevention scenarios including sign-up, login, account updates, checkout, and transactions. For instance, the instrumentation 153 may place tags on multiple pages that track user behavior and engagement using the device fingerprint. The tracked user behavior defined in the transaction contextual data may be used to differentiate a bot from a human, identify risky behavior, or find fraudsters using multiple accounts from the same machine. As another example of transaction contextual information, the instrumentation 153 may determine a payment context. The payment context may include information regarding a user's account or payment details. For example, the payment context may include an age of the customer's account, whether the payment information is stored by the website, and/or how many times the payment information, or different payment information for the customer, has been used at the website. The payment context may also include product details. The transaction contextual data generated by the sales website 152 and instrumentation 153 may be used by a merchant in evaluating risk of a transaction, but may not be available to a credit card issuer because only limited information can be provided via a credit card network 172.

A risk scoring component 154 may execute a risk scoring algorithm to determine a risk score based on the customer credit card transaction information and any other information available to the merchant, including transaction contextual information from instrumentation 153. The risk scoring component 154 may perform automated scoring using, for example, advanced machine learned scoring, long-term and short-term modeling, unsupervised learning, fraud sweeps, and anomaly detection. Each transaction may be given a score within a range. For example, the risk score may range from 1 to 10,000, with a lower score indicating a lower risk.

The acceptance optimization module 160 may assign a MID to each transaction in order to optimize a transaction acceptance rate for the merchant. The acceptance optimization module 160 may include a stratum component 162 that determines a stratum for the transaction based on a risk score. For example, the stratum of the transaction may be based on whether the risk score exceeds a threshold. In an implementation, a blocked stratum may include transactions with risk scores above a threshold. The merchant may block any transaction in the blocked stratum and assign no MID to such transactions. A low risk stratum may include transactions that are below a risk threshold. An acceptable risk stratum may include transactions with risk scores between the blocked threshold and the risk threshold. Each stratum may have a chargeback rate that may be determined statistically based on historical transactions for the stratum.

The acceptance optimization module 160 may improve an acceptance rate for one or more stratums and the overall acceptance rate for the merchant by assigning transactions to MIDs in a manner that achieves a target chargeback rate 164 for one or more MIDs. The acceptance optimization module 160 may statistically achieve the target chargeback rate by assigning transactions to each MID using a ratio of transactions from each stratum that will statistically yield the desired chargeback rate. That is, the historical chargeback rate for each stratum may be used to predict the ratio of transactions that will yield the target chargeback rate 164. The acceptance optimization module 160 may then assign transactions to each MID according to the ratio of transactions.

The bank system 170 may be operated by an issuing bank, which may also be referred to as a credit card issuer or retail bank, to approve or decline credit card transactions. The bank system 170 may receive credit card transaction information via a credit card network 172. For example, the credit card network 172 may carry transaction data including card information, transaction amount, merchant category code (MCC), geographic location, merchant identification number (MID), point of sale, and terminal for each transaction. The credit card network 172 may include multiple intermediaries. For example, the credit card network 172 may include an acquirer, a network or association, and third party service providers (e.g., security services).

The bank system 170 may include an authorization component 174 that determines whether to approve or decline a credit card transaction. The authorization component 174 may operate on the transaction information provided via the credit card network 172 to evaluate a risk of the credit card transaction. For example, risks may include fraud and chargebacks. Since the transaction data is limited, the MID may be an important field in risk evaluation.

Figure 2:
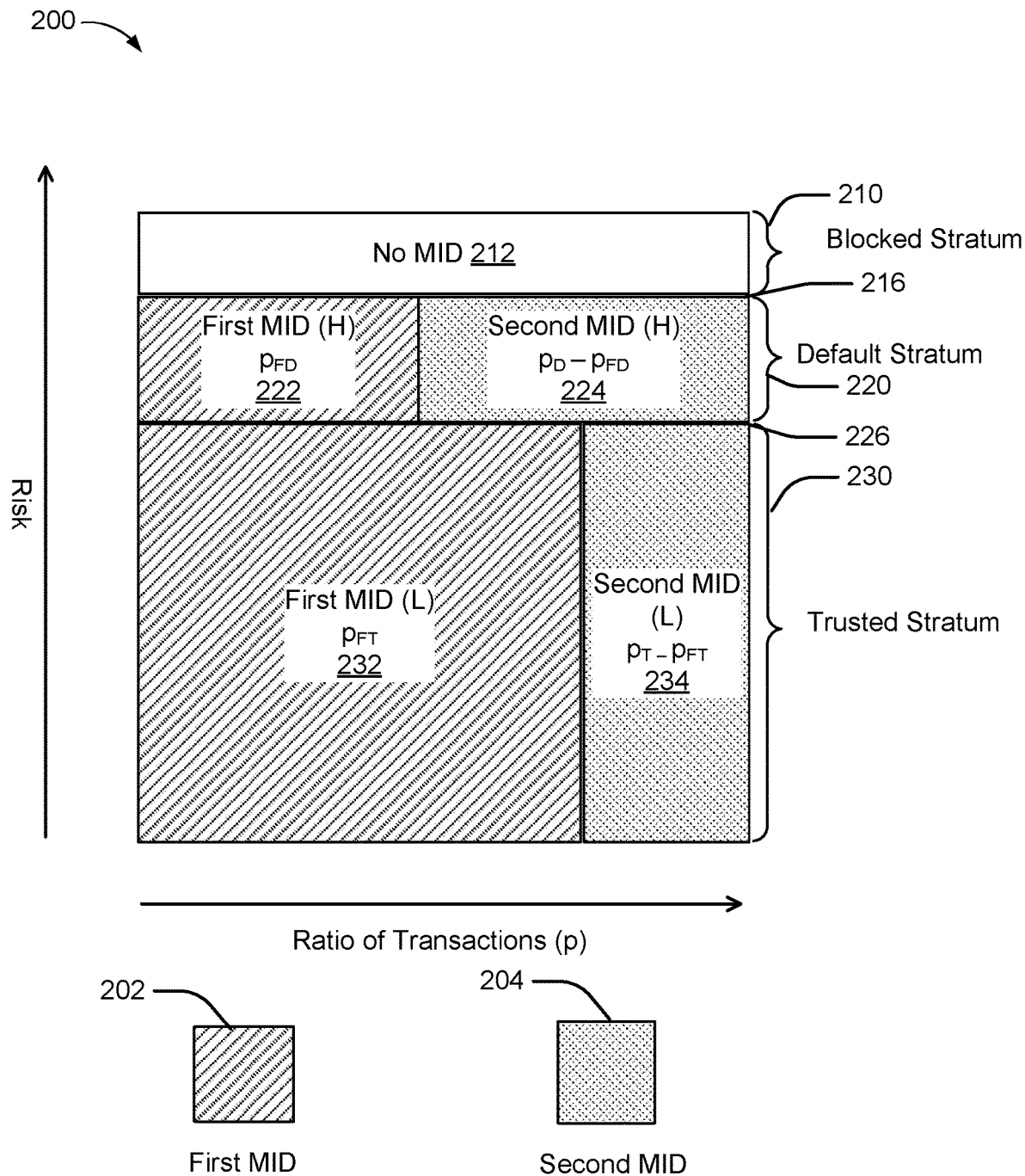
FIG. 2 is conceptual diagram illustrating an example dynamic MID allocation, in accordance with an implementation of the present disclosure.

FIG. 2 illustrates a dynamic MID allocation 200 that may be used by acceptance optimization module to allocate transactions between a first MID 202 and a second MID 204. A merchant may use multiple MIDs to sort transactions by a type of transaction, currency, or profit center. The first MID 202 and the second MID 204 may be for transactions that are otherwise similar (e.g., same type of transaction, currency, and profit center) but are used to separate transactions based on risk stratum to improve acceptance rates. The dynamic MID allocation 200 may include a blocked stratum 210, a default stratum 220, and a trusted stratum 230. The acceptance optimization module 160 may assign a stratum based on the risk score generated by risk scoring component 154. For example, the blocked stratum 210 may be assigned to a transaction with a risk score above a blocking threshold 216 (e.g., a score of 1000 on the 1-10000 scale). In an implementation, the blocking threshold 216 may be based on a level of risk that the merchant is willing to accept. On the opposite end of the spectrum, the trusted stratum 230 may be assigned to a transaction with a score below a risk threshold 226. The risk threshold 226 may be dynamically determined based on a chargeback rate or acceptance rate. For example, the risk threshold 226 may be set to a score that results in transactions assigned to the trusted stratum 230 having a desired chargeback rate ($CB_T$). The default stratum 220 may be assigned to transactions having a risk score between the risk threshold 226 and the blocking threshold 216. Transaction assigned to the default stratum 220 may have a higher chargeback rate ($CB_D$) than transactions assigned to the trusted stratum 230. As mentioned above, assigning MIDs to transactions based solely on risk score stratum may result in a MID associated with the trusted stratum 230 experiencing an increased approval rate, but a MID associated with the default stratum 220 experiencing a decreased approval rate.

The acceptance optimization module 160 may cross-populate a first MID 202 and a second MID 204 with transactions from the default stratum 220 and the trusted stratum 230 to improve overall acceptance rate. For example, the trusted stratum 230 may be divided into a first trusted MID group 232 and a second trusted MID group 234, and the default stratum 220 may be divided into a first default MID group 222 and a second default MID group 224. The first MID 202 may be designed to have a target chargeback rate that results in a higher acceptance rate, while the second MID 204 may be designed to have a chargeback rate that remains constant. In one implementation, for example, a target chargeback rate for the first MID 202 may be 0.5% and a target chargeback rate for the second MID 204 may be 2.0%. The target chargeback rates may depend on a merchant transaction pool and tolerable risk level (e.g., blocking threshold 216), which affect the overall chargeback rate for the merchant. The acceptance optimization module 160 may cross-populate the first MID 202 and the second MID 204 based on proportions or ratios of total transactions assigned to each MID group. For example, the trusted stratum 230 may include a percentage of total transactions ($p_T$). The first trusted MID group 232 may be assigned a percentage of total transactions ($p_{FT}$), and the remaining transactions ($p_T$-$p_{FT}$) may be assigned to the second trusted MID group 234. Similarly, the default stratum may include a percentage of total transactions ($p_D$). The first default MID group 222 may be assigned a percentage of total transactions ($p_{FD}$), and the remaining transactions ($p_D$-$p_{FD}$) may be assigned to the second default MID group 224. Transactions in the first trusted MID group 232 and the first default MID group 222 may be assigned to the first MID 202. Likewise, transaction in the second trusted MID group 234 and the second default MID group 224 may be assigned to the second MID 204.

An expected chargeback rate for the first MID may be:

$$CB_F = \frac{p_{FT} \times CB_T + p_{FD} \times CB_D}{p_{FT} + p_{FD}} \quad (1)$$

An expected chargeback rate for the second MID may be:

$$CB_S = \frac{(p_T - p_{FT}) \times CB_T + (p_D - p_{FD}) \times CB_D}{(p_T - p_{FT}) + (p_D - p_{FD})} \quad (2)$$

Figure 3:
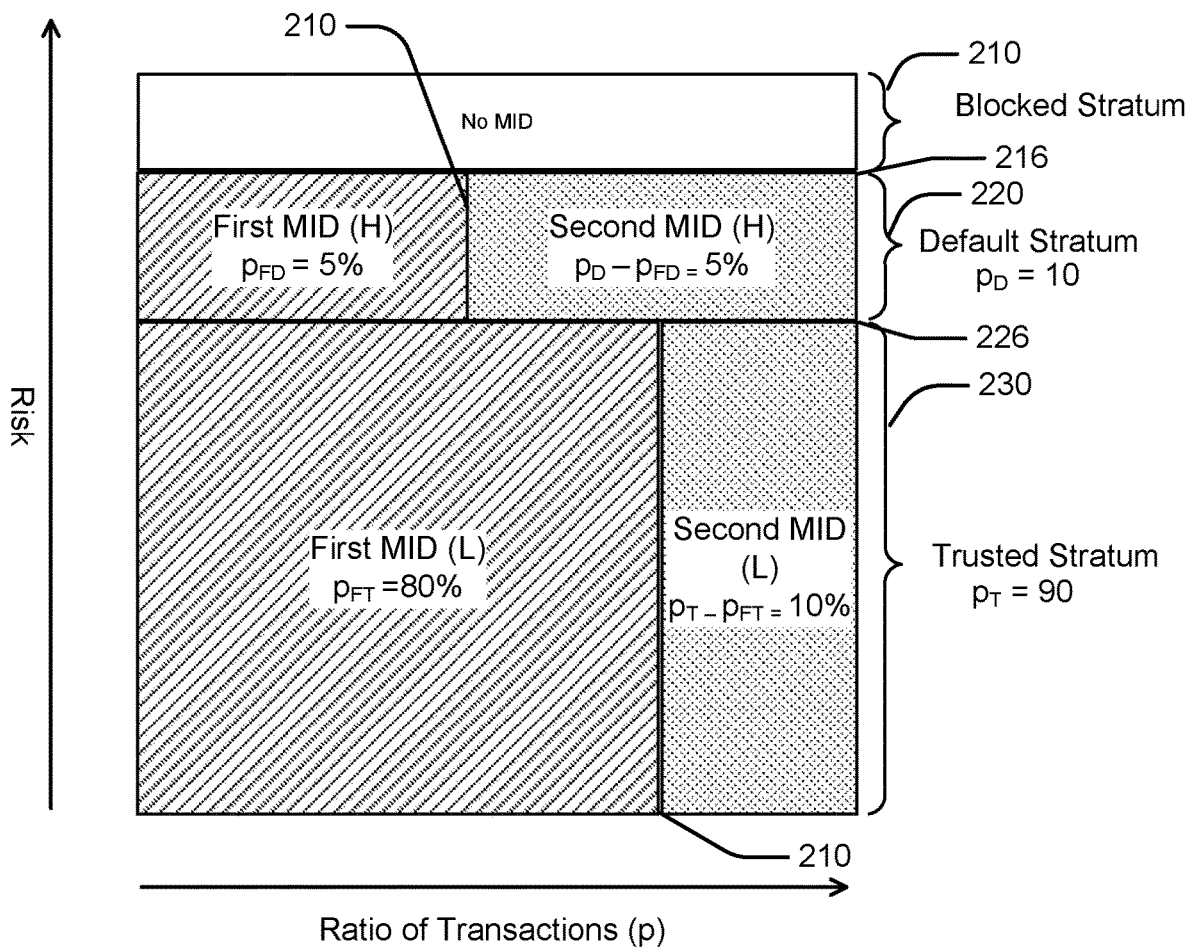
FIG. 3 is a conceptual diagram of a numerical example of the dynamic MID allocation of FIG. 2, in accordance with an implementation of the present disclosure.
Figure 3:
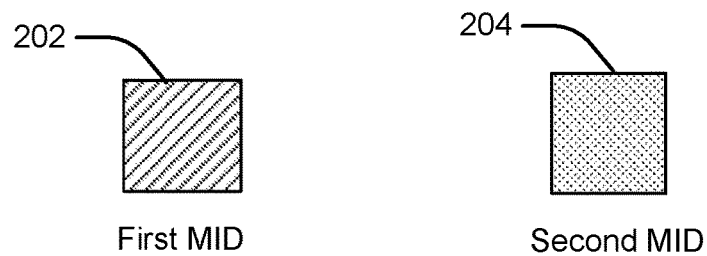

FIG. 3 shows a numerical example 300 of the dynamic MID allocation 200. As illustrated, $p_T$=90, $p_D$=10, $p_{FT}$=80, and $p_{FD}$=5. The chargeback rates may be $CB_T$=0.2% and $CB_D$=5%. According to formula (1), $CB_F$=0.48, which may be approximately 0.5%. According to formula (2), $CB_S$=1.8%. Therefore, although the default stratum 220 has a chargeback rate of 5%, by cross-populating with the trusted stratum 230 having a chargeback rate of 0.2%, the chargeback rate of the second MID ($CB_S$) may be only 1.8%, which may not result in a lower acceptance rate. The chargeback rate of the first MID ($CB_F$) may remain low at approximately 0.5%, which may result in a higher acceptance rate.

The parameters of the dynamic MID allocation 200 may be dynamically adjusted to meet particular acceptance rate or chargeback rate targets. For example, if the acceptance rate of the second MID begins to decline, $CB_S$ may be reduced by decreasing $p_{FT}$, thereby increasing $p_T$-$p_{FT}$. If the change to $p_{FT}$ would increase $CB_F$ above a target chargeback rate, the $CB_T$ and $CB_D$ may be reduced by lowering the blocking threshold 216 and/or risk threshold 226.

Figure 4:
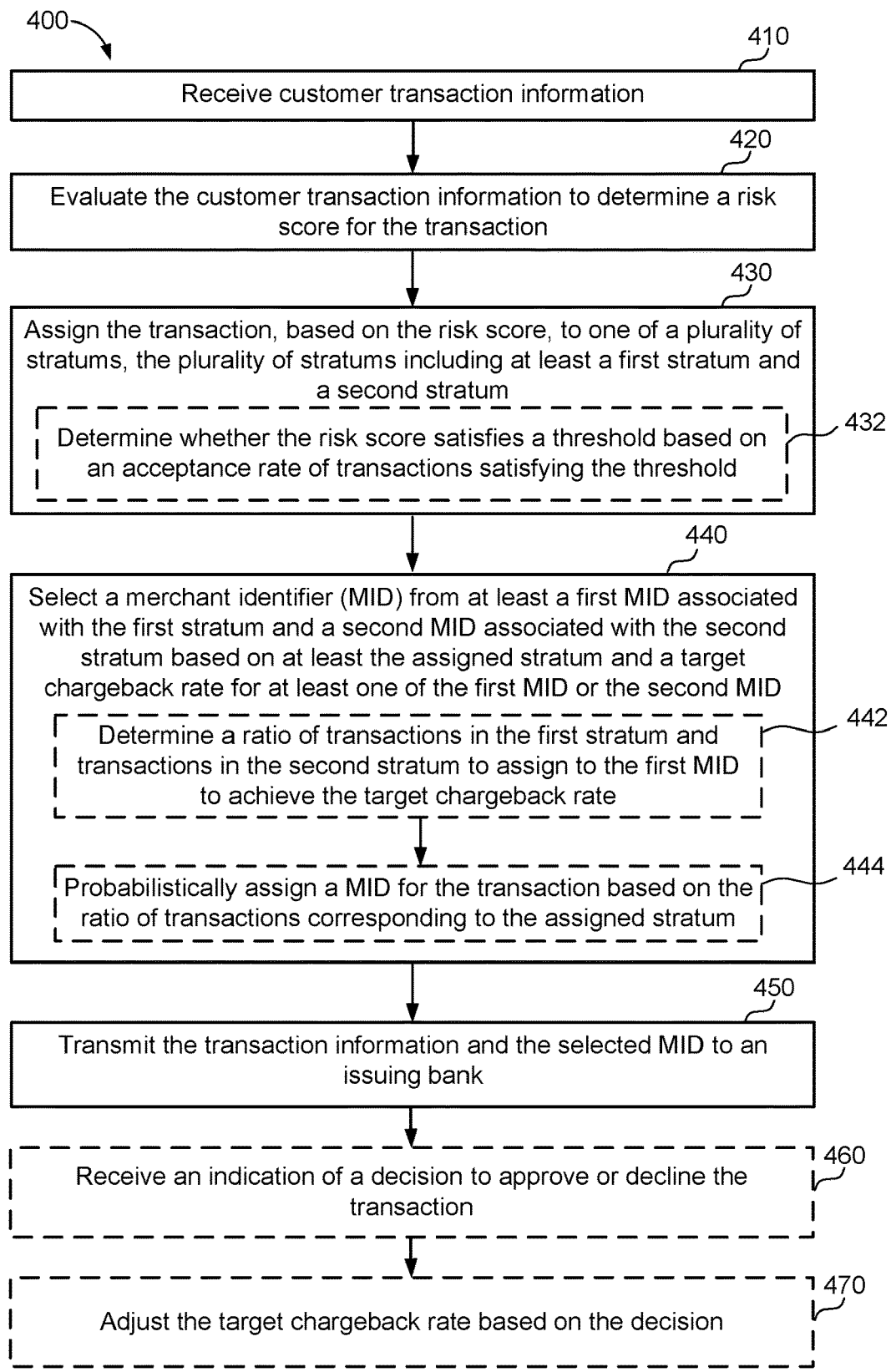
FIG. 4 is a flowchart of an example method of for processing credit card transactions, in accordance with an implementation of the present disclosure.

Turning to FIG. 4, an example method 400 assigns MIDs to transactions. For example, method 400 may be performed by the transaction processing application 150 on the computer device 110.

At block 410, the method 400 may include receiving customer transaction information. For instance, in an implementation, the sales website 152 may receive the customer transaction information. The transaction information may be entered by the customer. The transaction information may also include transaction contextual data collected by instrumentation 153.

At block 420, the method 400 may include evaluating the customer transaction information to determine a risk score for the transaction. For instance, in an implementation, the risk scoring component 154 may evaluate the customer transaction information to determine a risk score for the transaction.

At block 430, the method 400 may include assigning the transaction, based on the risk score, to one of a plurality of stratums. The plurality of stratums may include at least a first stratum and a second stratum. For instance, in an implementation, the stratum component 162 may assign the transaction, based on the risk score from risk scoring component 154, to one of a plurality of stratums 210, 220, 230 including at least a first stratum (e.g., trusted stratum 230) and a second stratum (e.g., default stratum 220). At block 432, the block 430 may include determining whether the risk score satisfies a threshold. The threshold may be based on an acceptance rate of transactions satisfying the threshold. For example, the stratum component 162 may determine whether the risk score satisfies one or both of the blocking threshold 216 and the risk threshold 226.

At block 440, the method 400 may include selecting a MID from at least a first MID associated with the first stratum and a second MID associated with the second stratum based at least on the assigned stratum and a target chargeback rate for at least one of the first MID or the second MID. For example, the acceptance optimization module 160 may select the MID from at least a first MID 202 associated with the first stratum 230 and a second MID 204 associated with the second stratum 220 based on the target chargeback rate 164 for at least one of the first MID 202 or the second MID 204. A MID may be associated with a stratum based on an ordinal priority of chargeback rate. For example, the trusted stratum 230 may be a first stratum that has the lowest chargeback rate due to lower risk scores, and the first MID 202 may be designed to have the lowest chargeback rate (e.g., by having a high proportion of transactions from the first stratum). Accordingly, the first MID 202 may be associated with the trusted stratum 230. As another example, the default stratum may be a second stratum in order of chargeback rate, and the second MID 204 may be designed to have the second lowest chargeback rate. Accordingly, the second MID 204 may be associated with the default stratum 220. In contrast, the blocked stratum 210 may not be associated with any MID. Further, association between a MID and a stratum does not necessarily require a majority of the transactions for the MID to be from the associated stratum. In the illustrated example of FIG. 3, the second MID 204 actually has more transactions from the trusted stratum 230 due to the relatively larger number of transactions in the trusted stratum.

At block 442, the block 440 may include determining a ratio of transactions in the first stratum and transactions in the second stratum to assign to the first MID 202 to achieve the target chargeback rate. In an implementation, for example, the acceptance optimization module 160 may determine a ratio of transactions in the first stratum (e.g., first trusted MID group 232) and transactions in the second stratum (e.g., first default MID group 222) to assign to the first MID to achieve the target chargeback rate. The ratio may be based on the chargeback rate associated with each stratum (e.g., $CB_T$ and $CB_D$).

At block 444, the block 440 may include probabilistically assigning a MID for the transaction based on ratio of transaction. In an implementation, the acceptance optimization module 160 may probabilistically assign the MID for the transaction based on the ratio of transactions. Probabilistically assigning the MID to a single transaction may include any technique that results in multiple transactions being assigned to the MIDs in the ratio of transactions. For example, an individual transaction may be assigned a random or pseudo-random number and then assigned to the MID by comparing the random or pseudo-random number to a threshold based on the ratio of transactions. As another example, transactions may be assigned to MIDs based on an order determined by the ratio of transactions (e.g., every other transaction for a 1:1 ratio). For an individual transaction, the assignment may have a probability of being assigned to each MID equal to the ratio of transactions for the respective MID.

At block 450, the method 400 may include transmitting the transaction information and the selected MID to an issuing bank. For instance, in an implementation, the transaction processing application 150 may transmit the transaction information and the selected MID to the issuing bank at bank system 170 via the network interface 120 and the credit card network 172. The transaction information and the selected MID may pass through intermediaries such as an acquirer. In an implementation, the selected MID may be a field of the transaction information submitted to the bank system 170.

At block 460, the method 400 may optionally include receiving an indication of a decision to approve or decline the transaction. For example, the transaction processing application 150 may receive the indication of the decision to approve or decline the transaction. The transaction processing application 150 may inform the customer of the decision via the sales website 152.

At block 470, the method 400 may optionally include adjusting the target chargeback rate based on the decision. For instance, the acceptance optimization module 160 may adjust the target chargeback rate 164 based on the decision.

The decision may have an incremental effect on the acceptance rate. For example, an accepted transaction may indicate that the acceptance rate is increasing and a declined transaction may indicate that the acceptance rate is decreasing. The acceptance optimization module 160 may adjust the target chargeback rate 164 for one or more MIDs to improve the acceptance rate of the MID or another MID.

Figure 5:
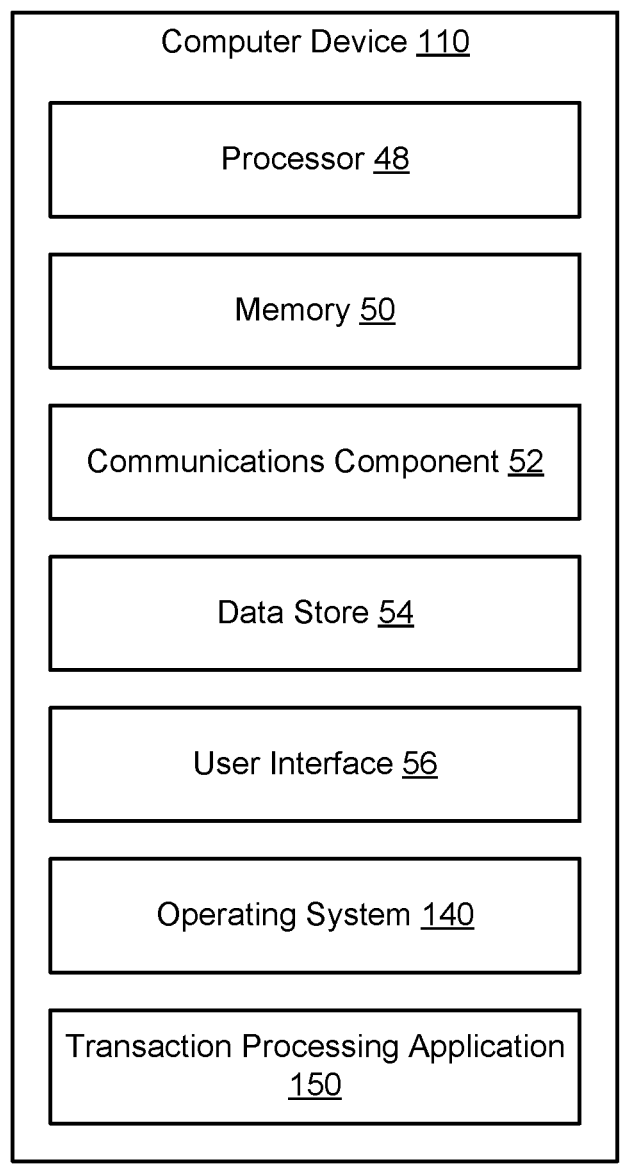
FIG. 5 is a schematic block diagram of an example computer device, in accordance with an implementation of the present disclosure.

Referring now to FIG. 5, illustrated is an example computer device 110 in accordance with an implementation, including additional component details as compared to FIG. 1. In one example, computer device 110 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include CPU 114.

In an example, computer device 110 may include memory 50 for storing instructions executable by the processor 48 for carrying out the functions described herein. In an implementation, for example, memory 50 may include memory 116. The memory 50 may include instructions for executing the transaction processing application 150.

Further, computer device 110 may include a communications component 52 that provides for establishing and maintaining communications with one or more parties utilizing hardware, software, and services as described herein. Communications component 52 may carry communications between components on computer device 110, as well as between computer device 110 and external devices, such as devices located across a communications network and/or devices serially or locally connected to computer device 110. For example, communications component 52 may include one or more buses, and may further include transmit chain components and receive chain components associated with a transmitter and receiver, respectively, operable for interfacing with external devices.

Additionally, computer device 110 may include a data store 54, which can be any suitable combination of hardware and/or software, that provides for mass storage of information, databases, and programs employed in connection with implementations described herein. For example, data store 54 may be a data repository for operating system 140 and/or applications 130. The data store may include memory 116 and/or storage device 118.

Computer device 110 may also include a user interface component 56 operable to receive inputs from a user of computer device 110 and further operable to generate outputs for presentation to the user. User interface component 56 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 140 and/or applications 130. In addition, processor 48 may execute operating system 140 and/or applications 130, and memory 50 or data store 54 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. A person skilled in the art should understand and appreciate that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device for processing transactions, comprising:
   memory; and
   a processing system comprising at least one processor communicatively coupled with the memory and configured to:
   receive, via a server hosting a website, customer transaction information and contextual data, wherein the contextual data includes a device fingerprint identifying a hardware device used to make a transaction, and wherein the server includes executable code configured to place tags on multiple pages of the website that track user behavior and engagement of a customer with the website using the device fingerprint and generate the contextual data for a session leading to the transaction;
   evaluate the customer transaction information and the contextual data to determine a risk score for the transaction;
   assign the transaction, based at least on the risk score, to one of a plurality of stratums, the plurality of stratums including at least a first stratum and a second stratum;

select a merchant identifier (MID) from at least a first MID and a second MID based at least on the assigned stratum and a target chargeback rate for at least one of the first MID or the second MID, wherein the first MID is associated with a lower target chargeback rate than the second MID, and wherein selecting the MID comprises determining a ratio of transactions in the first stratum and transactions in the second stratum to assign to the first MID to achieve the target chargeback rate; and transmit the customer transaction information and the selected MID to a transaction authorization entity via a network configured to accept limited fields for the customer transaction information.

2. The computer device of claim 1, wherein the ratio of transactions is based on a percentage of transactions in the first stratum, a chargeback rate of the first stratum, a percentage of transactions in the second stratum, and a chargeback rate of the second stratum.

3. The computer device of claim 1, wherein selecting the MID comprises probabilistically assigning the MID to the transaction based on the ratio of transactions corresponding to the assigned stratum.

4. The computer device of claim 1, wherein the at least one processor is configured to receive an indication of a decision to approve or decline the transaction.

5. The computer device of claim 4, wherein the at least one processor is configured to adjust the target chargeback rate based on the indication of the decision.

6. The computer device of claim 1, wherein the at least one processor is configured to determine whether the risk score satisfies a threshold for the stratum, wherein the threshold is determined based on an acceptance rate of transactions satisfying the threshold.

7. A method of processing transactions, comprising:
receiving, via a server hosting a website, customer transaction information and contextual data, wherein the contextual data includes a device fingerprint identifying a hardware device used to make a transaction, and wherein the server includes executable code configured to place tags on multiple pages of the website that track user behavior and engagement of a customer with the website using the device fingerprint and generate the contextual data for a session leading to the transaction;
evaluating the customer transaction information and the contextual data to determine a risk score for the transaction;
assigning the transaction, based on the risk score, to one of a plurality of stratums, the plurality of stratums including at least a first stratum and a second stratum;
selecting a merchant identifier (MID) from at least a first MID and a second MID based on a target chargeback rate for at least one of the first MID or the second MID, wherein the first MID is associated with a lower target chargeback rate than the second MID, and wherein selecting the MID comprises determining a ratio of transactions in the first stratum and transactions in the second stratum to assign to the first MID to achieve the target chargeback rate; and
transmitting the customer transaction information and the selected MID to a transaction authorization entity via a network configured to accept limited fields for the customer transaction information.

8. The method of claim 7, wherein the ratio of transactions is based on a percentage of transactions in the first stratum, a chargeback rate of the first stratum, a percentage of transactions in the second stratum, and a chargeback rate of the second stratum.

9. The method of claim 7, wherein selecting the MID comprises probabilistically assigning the MID to the transaction based on the ratio of transactions corresponding to the assigned stratum.

10. The method of claim 7, further comprising receiving an indication of a decision to approve or decline the transaction.

11. The method of claim 10, further comprising adjusting the target chargeback rate based on the indication of the decision.

12. The method of claim 10, wherein assigning the transaction to the stratum based on the risk score comprises determining whether the risk score satisfies a threshold, wherein the threshold is determined based on an acceptance rate of transactions satisfying the threshold.

13. A non-transitory computer-readable medium, comprising code executable by one or more processors for processing a transaction, the code comprising code for:
receiving, via a server hosting a website, customer transaction information and contextual data, wherein the contextual data includes a device fingerprint identifying a hardware device used to make a transaction, and wherein the server includes instrumentation configured to place tags on multiple pages of the website that track user behavior and engagement of a customer with the website using the device fingerprint and generate the contextual data for a session leading to the transaction;
evaluating the customer transaction information and the contextual data to determine a risk score for the transaction;
assigning the transaction, based on the risk score, to one of a plurality of stratums, the plurality of stratums including at least a first stratum and a second stratum;
selecting a merchant identifier (MID) from at least a first MID and a second MID based on a target chargeback rate for at least one of the first MID or the second MID, wherein the first MID is associated with a lower target chargeback rate than the second MID, and wherein selecting the MID comprises determining a ratio of transactions in the first stratum and transactions in the second stratum to assign to the first MID to achieve the target chargeback rate; and
transmitting the customer transaction information and the selected MID to a transaction authorization entity via a network configured to accept limited fields for the customer session information.

14. The non-transitory computer-readable medium of claim 13, wherein the ratio of transactions is based on a percentage of transactions in the first stratum, a chargeback rate of the first stratum, a percentage of transactions in the second stratum, and a chargeback rate of the second stratum.

15. The non-transitory computer-readable medium of claim 13, wherein the code for selecting the MID comprises code for probabilistically assigning the MID to the transaction based on the ratio of transactions corresponding to the assigned stratum.

16. The non-transitory computer-readable medium of claim 13, further comprising code for receiving an indication of a decision to approve or decline the transaction.

17. The non-transitory computer-readable medium of claim 16, further comprising code for adjusting the target chargeback rate based on the indication of the decision.

* * * * *